United States Patent [19]
Nozel et al.

[11] Patent Number: 5,020,707
[45] Date of Patent: Jun. 4, 1991

[54] COMPOUND HINGED TIRE CARRIER

[76] Inventors: Richard J. Nozel, 354 Edith Dr., West St. Paul, Minn. 55118; Ulric W. Trombley, Rural Rte. #1, Chisago City, Minn. 55013

[21] Appl. No.: 251,310

[22] Filed: Sep. 30, 1988

[51] Int. Cl.$^5$ ............................................. B62D 43/02
[52] U.S. Cl. .............................. 224/42.21; 224/42.24
[58] Field of Search ............. 224/42.21, 42.24, 42.25, 224/42.26, 42.27, 42.28, 42.3, 42.12, 42.06, 42.45 R, 42.08, 42.44; 414/465, 466, 463

[56] References Cited

U.S. PATENT DOCUMENTS

| | | | |
|---|---|---|---|
| 3,804,308 | 4/1974 | Bodde | 224/42.21 |
| 3,845,891 | 11/1974 | Becher | 224/42.21 |
| 4,019,664 | 4/1977 | Weiler | 224/42.45 R |

Primary Examiner—Linda J. Sholl
Attorney, Agent, or Firm—D. L. Tschida

[57] ABSTRACT

A hinged spare tire carrier externally mountable to a vehicle body and rotatable on compound hinged axes between latched rear and side mounting positions. In various alternative embodiments, the assembly includes a pair of fixed and adjustable multi-axis pivot links, pivotally hinged to the body and an extension framework which separately supports a rotatable tire support framework. Latch assemblies secured to the body and frameworks restrain one to the other and the vehicle during vehicle operation. In another embodiment, a compound hinged triangular framework includes a rotatable, tire supporting cross-arm. In still another embodiment a vertically rotatable tire support arm is provided.

13 Claims, 6 Drawing Sheets

COMPOUND HINGED TIRE CARRIER

BACKGROUND OF THE INVENTION

The present invention relates to vehicle mounted spare tire carriers and, in particular, to a compound hinged carrier requiring reduced amounts of working free space and rotating over an approximate 270 degree arc between rear and side mount positions.

Pick-up truck, van and other recreational vehicle owners have long been plagued with the problem of spare tire storage. That is, where and how-to store a full-size spare tire without taking up usable cargo space. As a consequence, a number of metal framework carrier assemblies have been developed for mounting the spare tire to the vehicle exterior which carriers may be found in many automobile stores, department stores or automotive catalogs. In particular, carriers have been developed for, among other places, supporting the tire from the vehicle undercarriage, front bumper, rear bumper, rear door and front/rear quarter panel.

The latter rear door and quarter panel assemblies, however, find particular advantage with vehicles having a hinged rear access door or gate. In some of these embodiments the tire carrier and tire are independently mounted to the vehicle body, away from the door/gate to prevent obstructing the door/gate during normal use. Such a mounting prevents damage to the door/gate which can occur over time with the tire weight producing body deformation, rust, etc. The separately mounted tire carrier, in particular is mountable to sturdier body parts, thereby being more tolerant to vehicle vibration.

An independent mounting, however, has its disadvantages in that use of the door/gate requires the operator to first disengage and rotate the tire to one side, to a temporary unrestrained position, before operating the door/gate in a conventional fashion. Thereafter, the tire must be resecured, before the vehicle can be operated.

A further shortcoming of such prior art carriers is that in cramped spaces, the radius of arc or working free space required to rotate the carrier is rather large. This is due to the rigidity of the carrier frame, which requires space for the frame as well as for the portion of the tire which extends beyond the end of the frame. Additional space is also required for the operator's movement such as is necessary to swing and walk around the carrier.

A still further shortcoming of such carriers is that to Applicant's knowledge, the frameworks provide only for a fixed vertical spacing between the vehicle pivots which requires a number of differently sized and configured carriers for different body types.

SUMMARY OF THE INVENTION

Accordingly, it is a primary object of the present invention to provide a spare tire carrier which requires reduced operating space and is operable between two vehicle supported restraint positions.

It is a further object of the invention to provide a tire carrier which closely mounts to the vehicle body and which rotates about multiple pivot axes with minimal free space requirements through a compound hinging arrangement.

A still further object of the invention is to provide a carrier which is operable over approximately 270 degrees of arc between a first restraint position, where the tire partially covers the vehicle rear door/gate, and a second restraint position, where the tire mounts along the vehicle side, but in either of which positions the tire is restrained to the vehicle and the vehicle may be operated without fear of damage from a free-swinging tire.

It is a still further object of the invention is to provide a carrier including adjustable vehicle pivots whereby the assembly may be mounted to a variety of different vehicle body constructions.

It is a yet further object of the invention to provide a support framework where the tire is rotatable relative to the framework.

The foregoing objects, advantages and distinctions of the present invention are particularly achieved in one presently preferred embodiment having a pair of multi-axis pivot links coupled to the vehicle body and an extension framework. Rotatively supported from an outer end of the extension framework is a tire support framework.

In another embodiment, the pivot link spacing is adjustable relative to the vehicle body. A pair of yoke-ended support arms particularly couple the extension framework to the pivot links. Cooperating latched restraints mounted to the vehicle door/gate, side quarter panel and between the extension and tire support frameworks secure the assembly at its two extreme ends of rotation.

In another alternative embodiment, the extension framework comprises a triangular assembly including a horizontal, rotatable cross-arm member. A spring loaded spindle secures the tire to the cross-arm and a pin member restrains the cross-arm at alternative rotation points relative to the vehicle.

In still another alternative embodiment and in lieu of a tire support framework, a vertically rotatable, spindled arm supports the tire to the extension framework. In all embodiments, intermediate rotation is achieved through a radius of arc less than the framework length via the compound frame and tire hinging which permits independent rotation of the tire support and extension frameworks relative to each other and to the pivot links and vehicle.

The foregoing, objects, advantages and distinctions of the invention, among others, as well as its detailed construction will become more apparent hereinafter upon directing attention to the following description with respect to the appended drawings. Before referring thereto, it is to be appreciated the following description is made by way of presently preferred embodiments only and is not intended to be all inclusive in its description. To the extent modifications have been contemplated, they are described as appropriate. Otherwise, the invention is to be interpreted within the scope of the following claims.

DESCRIPTION OF THE PREFERRED EMBODIMENT

Figure 1:
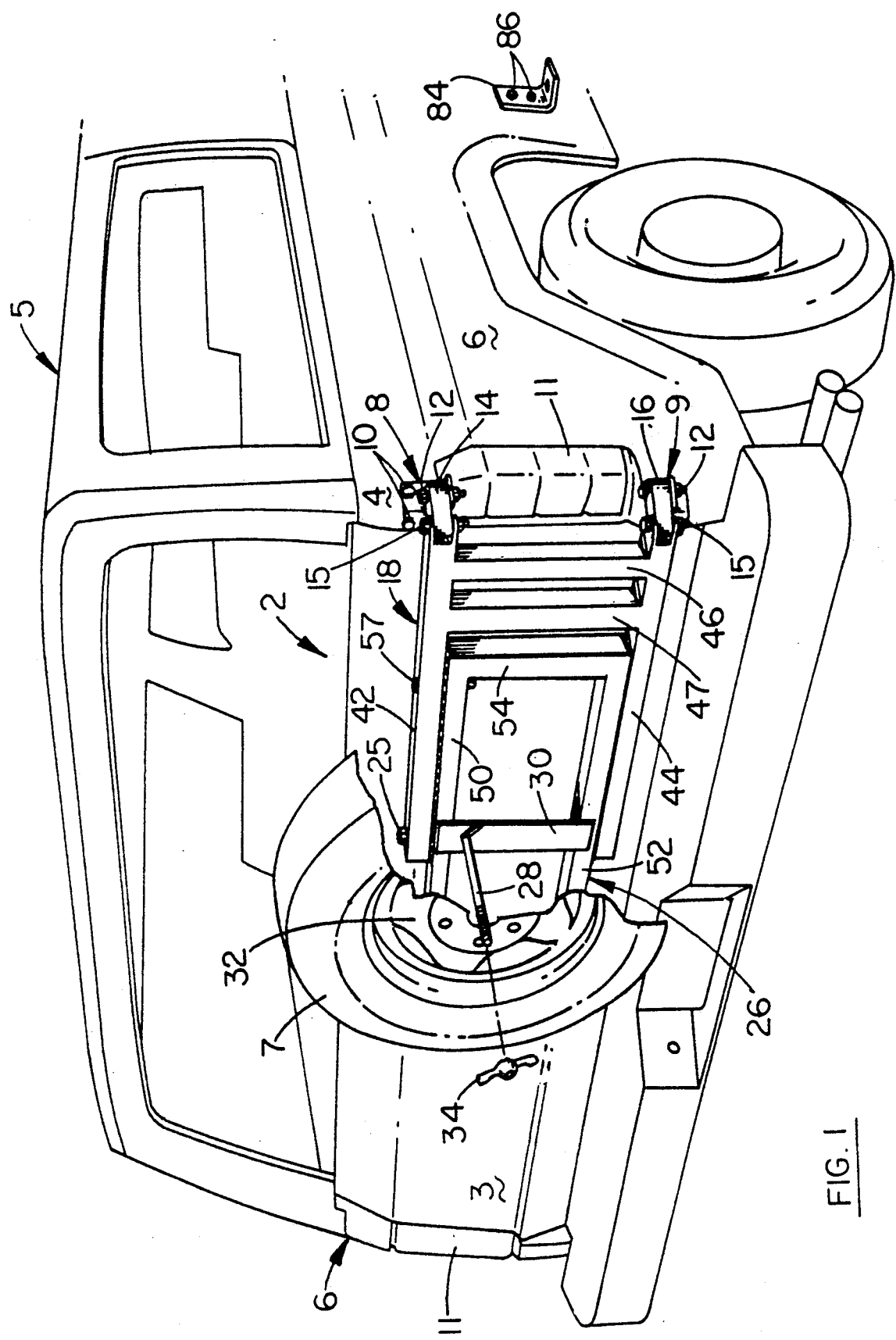
FIG. 1 shows an assembled isometric view of the rear mounting position of the present carrier relative to a typical vehicle with the tire shown in partial cut away.

Referring to FIG. 1, an isometric view is shown of one embodiment of the subject spare tire carrier 2 in mounted relation to the rear tail gate 3 of a typical pickup truck 5 and wherein the spare tire 7 is shown in partial cutaway. As mounted, the carrier assembly 2 is secured to the vehicle body at the rearmost corner 4 of one of the vehicle's side quarter panels 6 via a pair of upper and lower pivot brackets 8 and 9.

As depicted, the carrier 2 is mounted in restrained covering relation to the vehicle's rear tail/gate 3, although it is to be appreciated the assembly equally mounts in restrained relation along the side quarter panel 6, upon rotating the assembly 2 into engagement therewith. The vehicle is thus operable with the tire carrier 2 in either of the alternative restrained mounting positions, although it is contemplated in most circumstances the tire 7 would mount as shown over the vehicle's tail gate 3.

Figure 2:
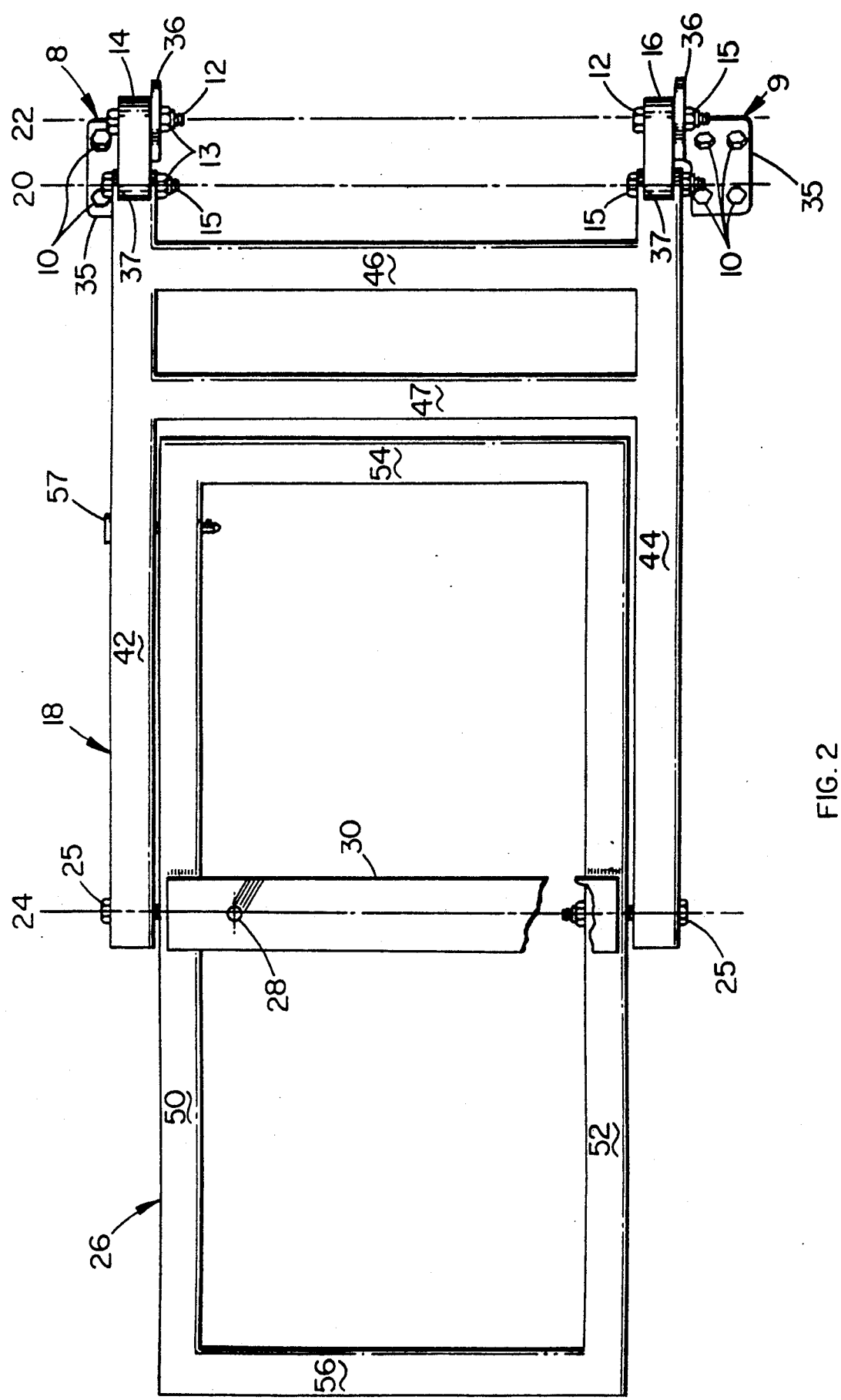
FIG. 2 shows a front elevation view of the carrier of FIG. 1, less the spare tire.

With additional attention directed to FIG. 2, a detailed front elevation view is shown of the tire carrier assembly 2 and wherefrom it is to be generally appreciated that the assembly 2 is constructed of square, tube stock of a nominal 3/16 inch wall thickness and one inch by one inch cross-sectional dimension. Alternatively, other cross-sectional dimensions and wall thicknesses or round tube stock and/or appropriately sized rectangular stock may be used. Given too the application, all frame members are weather-treated, anodized, plated and/or painted to minimize corrosion.

The assembly 2 is supported from the pivot brackets 8 and 9 via a number of mounting bolts 10 which extend through the vehicle body and are secured to a backing plate member (not shown) mounted to the back side of the quarter panel 6 above and below the tail lights 11. Pivotally extending from each of the brackets 8 and 9 via a first pair of capped pivot pins or non-binding bolts 12 having capped nuts 13 are upper and lower pivot links 14 and 16. The outer ends of the pivot links 14 and 16, in turn, are pivotally secured to an extension framework 18 via another pair of non-binding, capped pivot pins 15 at a second vertical axis of rotation 20, displaced to one side of the first axis of rotation 22 formed through the primary brackets 8 and 9.

Pivotally mounted at a third axis of rotation 24 at an extreme end of the extension framework 18 via other capped, non-binding pivot pins 25 is a spindled tire support framework 26. The framework 26 is sized and configured to rotate approximately 360 degrees, relative to and independent of the extension framework 18, which rotation is centered about the pivot axis 24. Mounted in orthogonal aligned relation with the pivot axis 24 is a threaded spindle 28 which extends from a plate member 30 welded to the framework 26. The tire 7 and its wheel 32 are secured to the spindle 28 via a locking wing nut 34 which mounts to over the threaded outer end portion of the spindle 28 that extends through the wheel 32. Thus, the spare tire 32 is securely mounted to the carrier assembly 2.

In combination, the three independent, vertically hinged pivot axes 20, 22 and 24 permit a travel arc of 270 degrees relative to the vehicle. Including the tire 7, a swing radius of only approximately three feet or the length of the extension framework 18 is required, in contrast, to other known carriers which require a radius approaching four feet. The working free space requirements are thus reduced via the compound hinging of the present assembly.

Returning attention to the upper and lower hinge brackets 8 and 9 of FIG. 2, the brackets are presently constructed as shelved standoffs and are appropriately bored to receive the bolt fasteners 10 and pivot pins 12. As depicted, the vehicle mounting portion 35 is secured to the vehicle via the bolts 10. Projecting shelf portions 36 extend outward in face-to-face, spaced apart relation to one another. The pivot links 14 and 16 rest on top of the shelves 36. Depending upon the vehicle, the shelves 36 may be inverted with the arms 14 and 16 mounting to the shelf bottoms. The primary concern is that a rigid mounting is obtained with sufficient clearances between the assembly 2 and any vehicle ornamentation and without obstructing the vehicle tail lights 11.

Extending from the mounting brackets 8 and 9 are the upper and lower pivot links 14 and 16 which are bored at their inner and outer ends. They are constructed of similar lengths of solid stock. The inner end of each link 14, 16 is secured to the brackets 8, 9 with the pivot pins 12. The outer ends of the links mount within the U-shaped, yoked inner ends 37 of the extension framework 18. The pivot pins 15 mount through the aligned outer bore in each link 14, 16 and the mating bores in the yoked ends 37 of the extension frame 18. A slight space is provided between the extreme end of the links 14 and 16 and the inner end of the yokes 37 to prevent a non-binding, full rotation of the links 14 and 16 relative to the yokes 37, just as the depth of the mounting bracket ledges 36 permit the free rotation of the links thereabout.

The links 14, 16 and pivots 12, 15 thus provide free rotation of the carrier 2, without pinching the frame members. The multi-axis pivot links 14 and 16 particularly minimize the swing radius of the carrier 2 during rotation and enable the carrier 2 to mount in close proximity to the vehicle when in either resting position. It is to be further appreciated that, depending upon the tire and frame weight, intermediate bushing members may be included at each pivot pin 12, 15 or 25 to minimize wear.

In contrast to prior, rigid frameworks, the present carrier 2 permits an operator, upon releasing a carrier restraint, to laterally displace the carrier 2 to one side with only a slight extension away from the vehicle, limited to the length of the pivot length 14, 16. Depending upon the door/gate construction, such as where a split vertical rear door is provided, this limited motion may permit access to the vehicle interior. Alternatively, for cramped spaces or a rear gate, a further rotation of the pivot links 14, 16, along with the extension and tire support frameworks 18, 26 fully exposes the door/gate.

Extending from the pivot links 14 and 16 is the extension framework 18 which is comprised of upper and lower horizontal members 42 and 44. The members 42, 44 are spaced apart from one another via vertical supports 46 and 47 and all of which are welded to one another. Alternatively, a combination of bends and welds may be used. The vertical support 47 is offset to the right of the left ends of the horizontal supports 42, 44 to provide for a U-shaped space wherein the tire support framework 26 is rotatably received.

The tire support framework 26 is, in turn, constructed to nest inside the extension framework 18 and includes upper and lower horizontal frame members 50 and 52 and vertical end members 54 and 56, all of which are welded/bent to form the shape shown. The arms 50 and 52 are sized to extend a sufficient distance to support the side walls of the mounted tire 7. Vertical bore holes let through the horizontal members 50 and 52 mate with a pair of bores let into the extreme ends of the extension members 42, 44 and whereat the third set of capped, non-binding pivot pins 25 mount. Secured adjacent the third pivot axis 24 to the plate member 30 is the threaded spindle 28 to which the tire and wheel 7, 32 are secured.

A latch pin 57 is also provided. It mounts through bores let in the horizontal members 42 and 50 and prevents undesired rotation of the tire support framework 26 which is otherwise free to rotate at the end of the extension framework 18.

Recalling the reduced travel arc permitted by virtue of the pivot links 14 and 16, it is to be appreciated the carrier 2's required working space is further minimized due to the rotatability of the tire support framework 26 about the pivot axis 24. That is, because the support framework 26 may be separately rotated, its effective length can be reduced by the radius of the tire 7. An operator can thus separately rotate the tire 7 as the assembly 2 is pushed to the side and rotated about the pivot links 14 and 16. Cramped parking conditions can consequently be accommodated. Improved access is also thereby facilitated to the tire, such as during tire repairs or when the tire 7 is rotated into alignment with the quarter panel 6.

Figure 3:
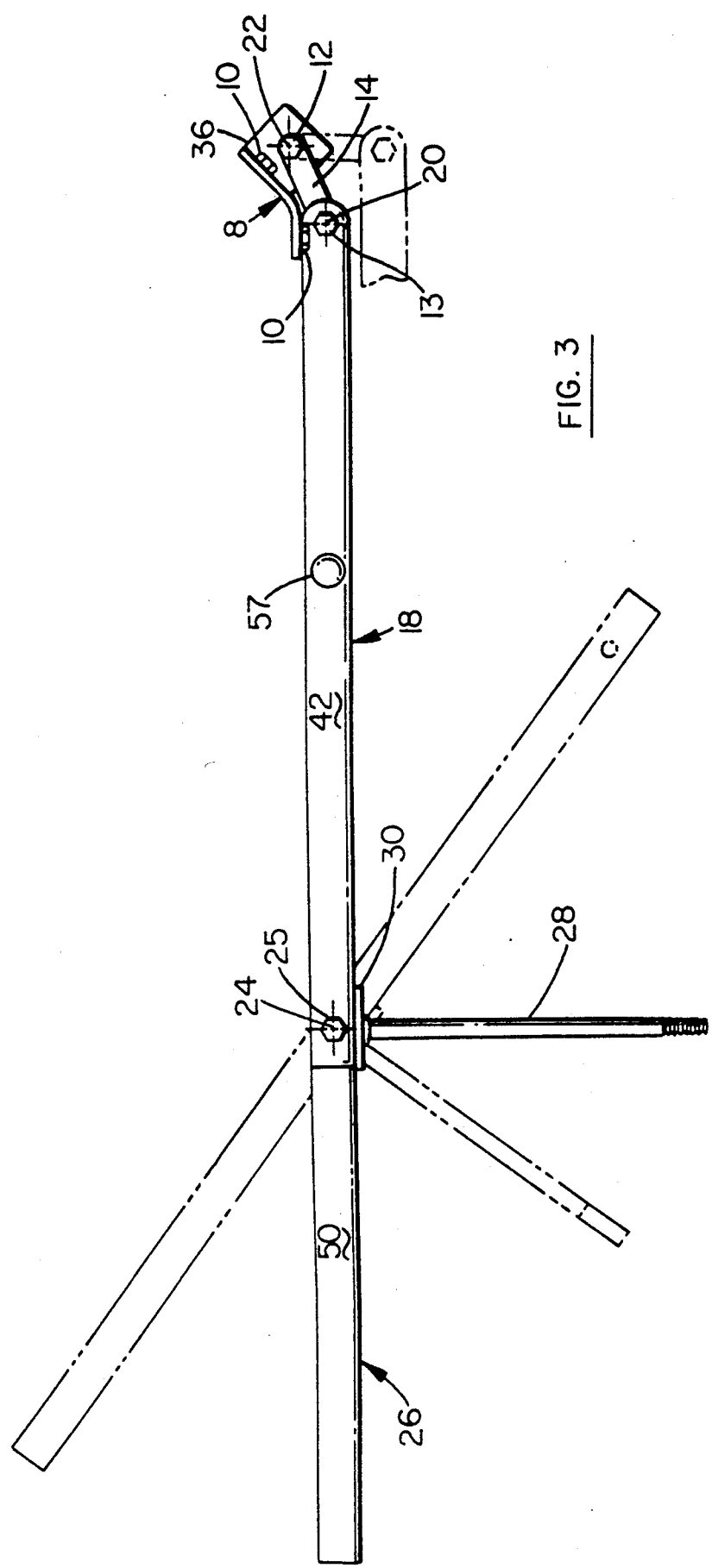
FIG. 3 shows a top plan view of the carrier and relative to which the tire support and extension frameworks are shown and partially rotated to alternative positions.

In the latter regard, additional attention is directed to FIG. 3; there a top plan view is shown of the mounting relation of the pivot link 14, extension framework 18 and tire support framework 26 to one another and relative to the pivot axes 20, 22 and 24. The rotatability of the tire support framework 26 at the pivot pin 25 and pivot axis 24 is particularly shown in phantom. Also shown in phantom is the rotatability of the extension framework 18 and pivot link 14 relative to the bracket 8.

The foregoing multi-pivot axis construction also provides for a range of mountings relative to vehicle ornamentation, lights, etc. That is, the open frameworks 18, 26 permit much of such ornamentation to mount within the recesses of the frame members. For those instances where such ornamentation/lights are obstructed by the tire or support frameworks 18, 26, it may be necessary to extend the tire carrier framework 26 away from the vehicle and the extension framework 18 such as with standoffs (not shown) to offset the tire support framework from the extension framework.

Figure 4:
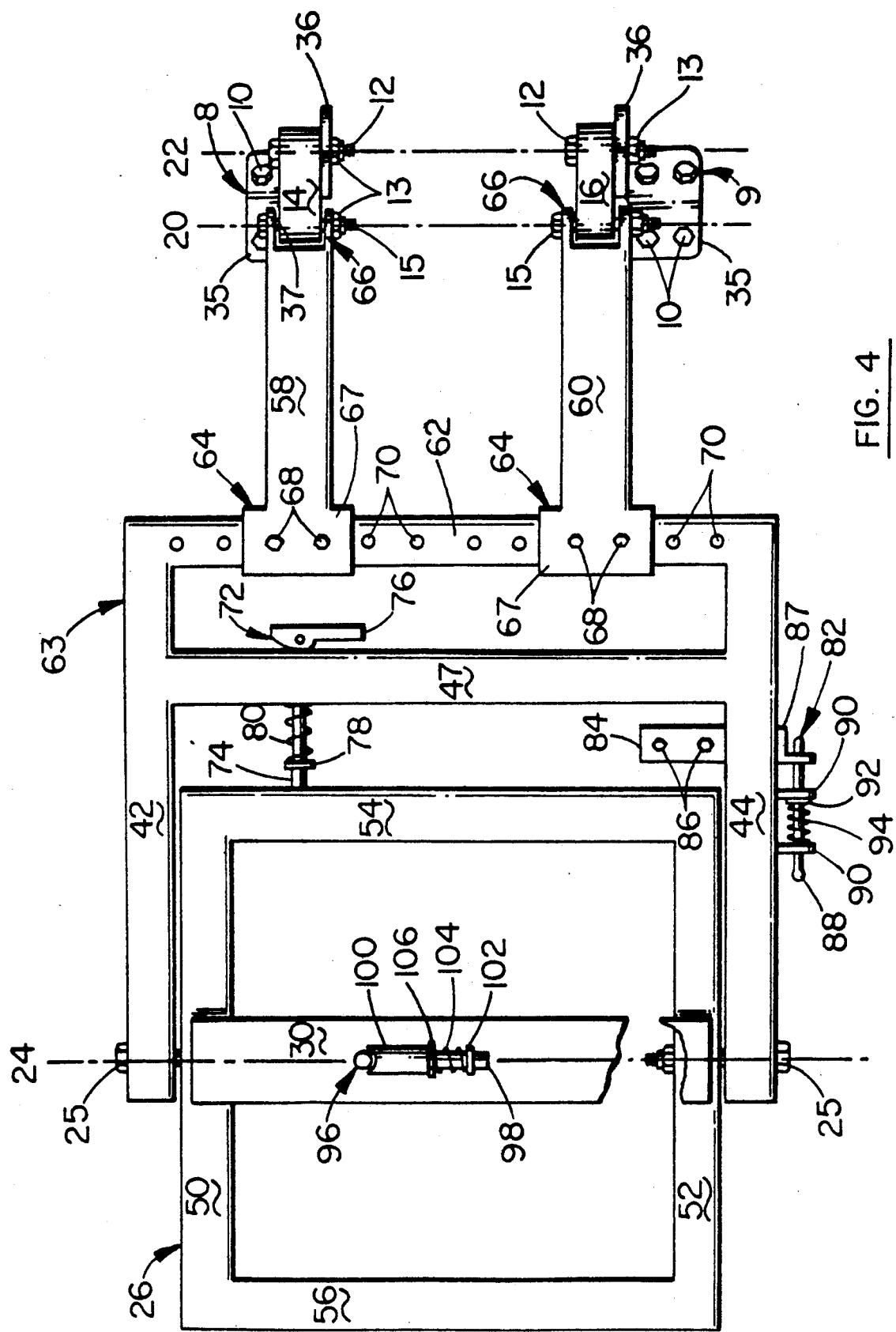
FIG. 4 shows a front elevation view of a carrier like that of FIG. 1 including spacing adjustable, vehicle pivot links.

Turning attention next to FIG. 4, a front elevation view is shown of an alternative construction of the invention wherein a narrower separation is achievable between the mounting brackets 8, 9. For this embodiment, the pivot links 14, 16 are secured to upper and lower yoke arms 58 and 60 which are adjustable along a vertical support 62 of a modified extension framework 18. That is, a bored, vertical frame member 62 extends along the rightmost end of the extension framework 18 in lieu of the member 46. Bored yoke portions 64 of the arms 58, 60, mate with the bores of the arm 62. The opposite end of each arm 58, 60, in turn, includes a yoke portion 66 which, as with the yoke ends 37, mounts to the pivot links 14, 16 at the pivot axis 20.

The yoke end 64 of each arm 58, 60 particularly comprises a U-shaped yoke which is rotated 90 degrees vertically from an opposite end yoke portion 66. Let into the side arms 67 of each yoke end 64 are pairs of apertures and through which bolt/nut fasteners 68 extend in mating alignment with holes 70 let through the support 62. Thus, the separation of the yoke arms 58, 60 along the extension framework 18 and pivot brackets 8, 9 relative to the vehicle may be adjusted relative to one another as desired to meet the positioning requirements of any vehicle. Although bolted yoke ends are presently used, it is appreciated that a variety of other mounting arrangements might be used to secure the arms 58, 60 to the frame member 62 so long as the extension framework 18 is rigidly secured to the pivot links 14, 16.

Also provided in the embodiment of FIG. 4 is a latch assembly 72 which, in contrast to the pin restraint 57 of FIG. 2, extends from the vertical support 46 and mates with a hole bored in the right side of the vertical support 54. The latch assembly 72 is particularly comprised of a slide operated latch pin 74 and to the right end of which is pivotally mounted a cam-acting handle 76. Secured along the shank of the pin 74 is a washer 78 and to the right of which a spring 80 biases the pin 74 into its locked mounting position with the member 54. Otherwise, the pin 74 is released under spring pressure upon rotating the handle 76 upward to cause the upper cam edge 81 to push against the member 47.

Cooperating in locked engagement with the horizontal extension arm 44 is a second latch assembly 82 which restrains the carrier 2 to the vehicle body. It comprises a body mounted, L-shaped restraint arm 84 which is secured to the body with bolt/nut fasteners 86 (see also FIG. 1). A bracketed shelf arm 87 extends away from the vehicle to normally support the extension arm 44 thereon. The displacement of the extension arm 44 away from the vehicle is defined via a cooperating, spring biased latch pin 88 assembly which extends from the bottom of the frame member 44.

That is, the latch pin 88 is slidably mounted in a pair of bored, offset arms 90 welded to the bottom of the extension arm 44. A washer-like stop member 92 secured to the pin 88, in cooperation with a spring 94, biases the pin 88 to its locked position with the pin 88 aligning with a mating hole in the support shelf 87.

Although the latch assembly 82 is depicted only in combination with the embodiment of FIG. 4, it is to be appreciated that similar latch assemblies 82 are used to restrain the embodiment of FIG. 1 to the vehicle. That is, latch plates 84 are mounted not only to the rear door/gate, but also along the side of the rear quarter panel 6, to receive the carrier assembly 2 at each of its resting positions.

While, too, under most circumstances the side mount position is as secure as the rear mount position, the rear mounting position is normally preferred, since the tire 7 encounters less wind resistance in this position during normal travel. Accordingly, the side mount position is contemplated more for temporary convenience, although it does restrain the carrier in a fashion that permits free unimpeded access to the rear door/gate. When the carrier 2 is rotated to a side mount position, it is to be further noted that the tire support framework 26 is always rotated to continuously present the outer face of the tire away from the vehicle.

Also shown in FIG. 4 is an alternative construction of the threaded spindle 28. In lieu of a single threaded rod, a spring biased L-shaped spindle assembly 96 is provided and a detailed view of which is disclosed in FIG. 6. The spindle assembly 96 comprises a threaded L-shaped spindle arm 98 which slidably mounts within a collar 100 welded to the plate member 30. Secured to the bottom end of the spindle arm 98 is a washer-like stop 102 and above which is mounted a spring 104. The spring 104 engages a washer 106 at the bottom of the collar 100 and biases the spindle arm 98 into engagement with the collar 100.

Let into the uppermost surface of the collar 100 are a plurality of U-shaped retainer notches 108 which are displaced 90 degrees from one another. The spindle 98 may thus be raised/lowered and re-positioned to various of the notches 108, depending upon whether a tire 7 is mounted to the carrier assembly 2. When a tire is not mounted to the carrier, the spindle 98 would normally be mounted in a side facing position with the spindle arm 98 securely engaging one of the notches 108.

Figure 5:
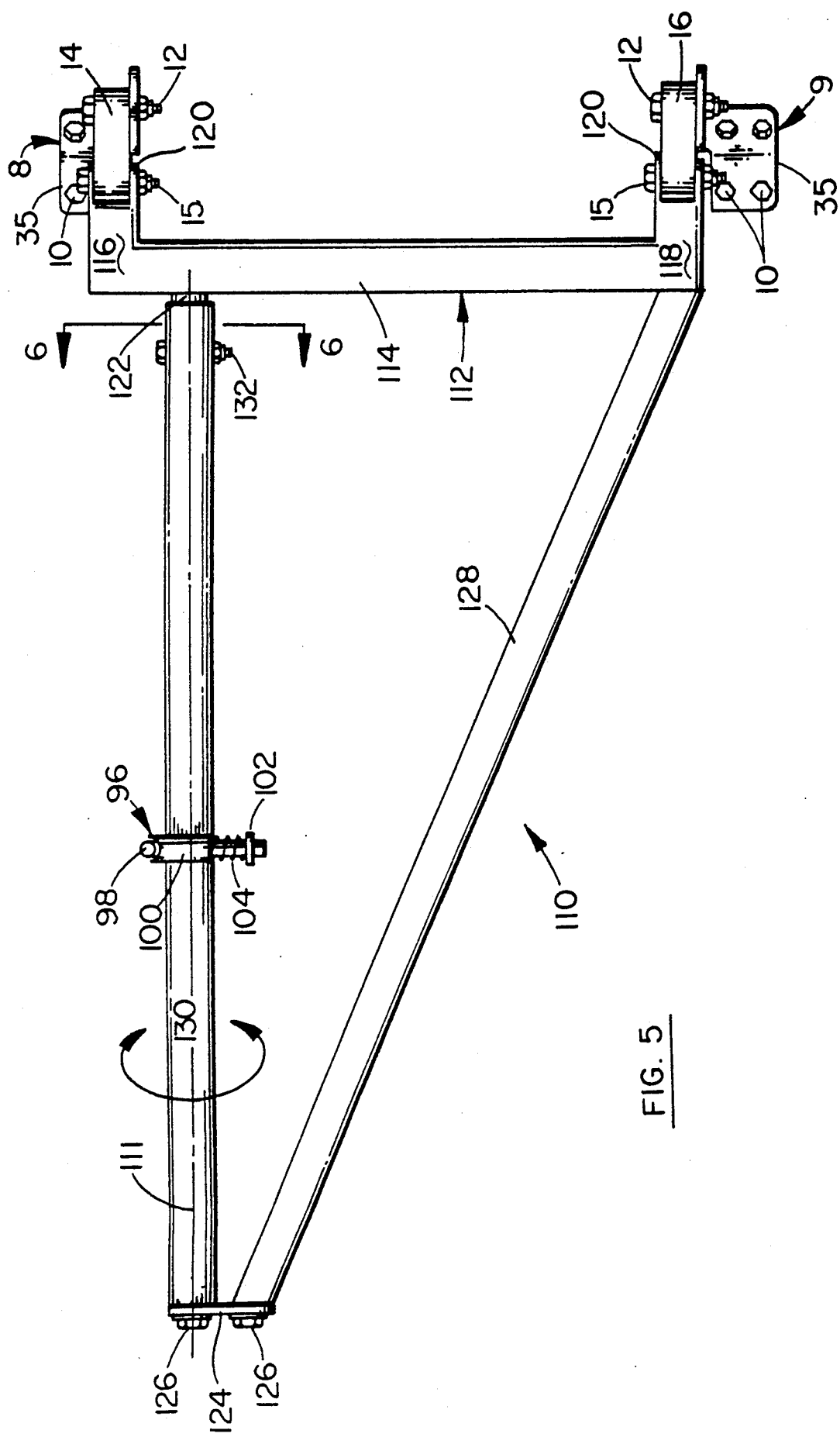
FIG. 5 shows a front elevation view of a triangular carrier with a rotatable tire support cross-arm.

Turning attention next to FIG. 5, yet another alternative, triangular-shaped assembly 110 is shown. Whereas the embodiments of the FIGS. 1 through 4 each included three vertical pivot axes 20, 22 and 24, the assembly 110 provides for two vertical pivot axes 20, 22 and one horizontal axis 111. The vertical axes 20, 22 are again achieved with pivot brackets 8, 9 and pivot links 14, 16 which support a tire support framework 112 to the rear or side of the vehicle.

Otherwise, the horizontal axis 111 is achieved with the modified support framework 112. The rightmost side of the framework 112 comprises a vertical support arm 114 and from upper and lower ends of which extend horizontal, yoked arm portions 116 and 118. Provided yoke-shaped ends 120, similar to the yoke ends 37, along with pivot pins 15 secure the framework 112 to the hinge brackets 8, 9.

Horizontally extending from the left side of the support arm 114 is a member 122, which may be tubular or solid and which terminates at an end plate 124. A bolt 126 cooperating with a threaded nut portion 136 (reference FIG. 6) welded to the inner bore of the member 122, secures the end plate 124 thereto. Angulating upward from the lower end of the vertical support 114 to the end plate 124 is a brace arm 128 which similarly is secured there via a bolt 126 and internal welded nut 136.

Rotatably mounted about the member 122 is a tire supporting tubular member 130. A spindle assembly 96 is welded to the member 130 at its collar 100 and whereby the tire 7 is secured to the support assembly 110.

Figure 6:
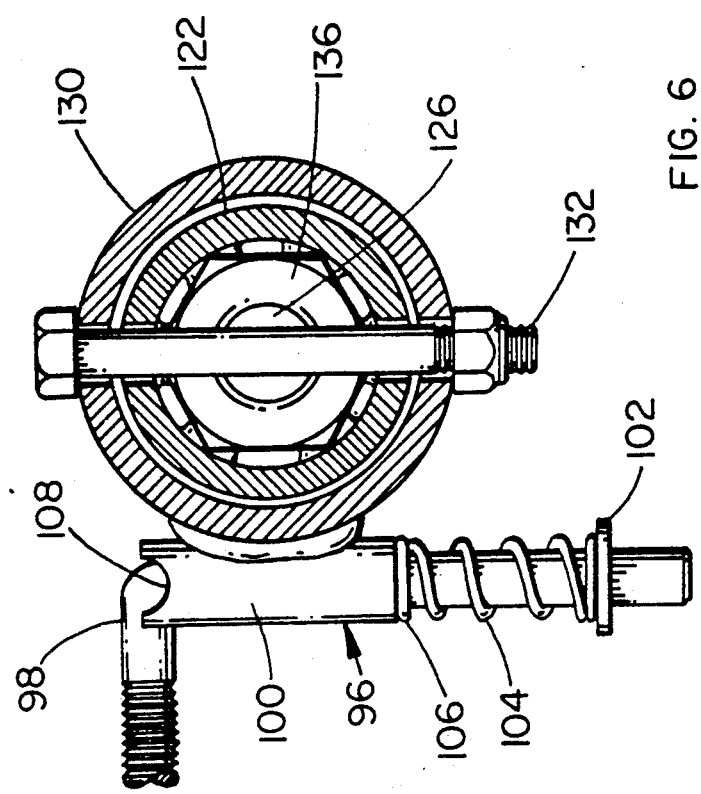
FIG. 6, taken along section lines 6-6 of FIG. 5, shows a detailed elevation view of the rotatable tire support cross-arm.

A detailed view of the mounting relation of the tubular member 130 to the member 122, as well as of the spindle assembly 96, can be seen from FIG. 6 which is taken along reference line 6—6 of FIG. 5. From FIG. 6, it is particularly to be noted that, except for a vertical stop pin or bolt/nut fastener 132, the member 130 is rotatable relative to the member 122. In fact, the member 130 may be rotated 360 degrees relative thereto, even though the brace arm 128 restricts rotation to one direction only. Thus, when a tire 7 is supported from the member 130, depending upon the mounting to the vehicle, the operator can release the bolt/nut 132 and rotate the tire 7 and spindle 96 about the cross-arm 122 to present the proper side of the tire 7. As before and although not shown, a latch bracket 84 supports and restrains the member 130 from the vehicle rear or side.

Figure 7:
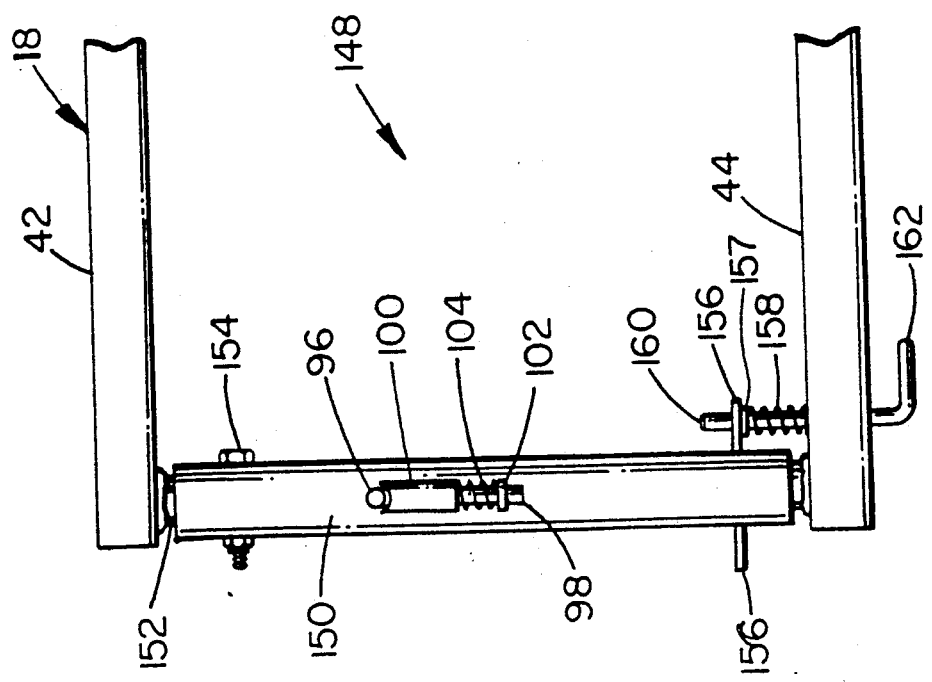
FIG. 7 shows a partial elevation view of a vertically rotatable tire support arm.

With attention lastly directed to FIG. 7, yet another alternative embodiment is shown of a hybrid assembly 148 including a vertically rotatable support arm 150 like the arm 130 of FIG. 5, although mounted vertically and in combination with the horizontal extension frame members 42, 44 in lieu of a framework 26. The rightmost end of the extension framework 18, although not shown, might be constructed as in FIGS. 2 or 4. Otherwise, a pivot member 152 extends between the frame members 42, 44 to rotatably support the member 150 and a tire 7 (not shown) which again would mount to a spindle assembly 96 secured at its collar 100 to the member 150. A lock bolt/nut 154 can be used to restrain the member 150 against undesired rotation. Alternatively, a pair of bored wings 156 welded to the member 150 can be selectively engaged by a spring 158 biased, latch arm 160 having a handle portion 162 mounted to permit slide operation of the arm 160.

While the invention has been described with respect to various preferred, alternative constructions of a spare tire carrier and various contemplated modifications thereto. Moreover, it is to be appreciated still other modifications may be suggested to those of skill in the art, and instead of supporting a tire, just as the present carrier is adaptable to supporting other utility items such as spare gasoline containers, propane bottles for contained stoves/heaters and the like. It is accordingly contemplated that the following claims should be interpreted to include all those equivalent embodiments within the spirit and scope thereof.

What is claimed is:

1. A vehicular utility carrier comprising:
   (a) first and second brackets and means for mounting said first and second brackets in displaced relation to each other and to a vehicle;
   (b) first and second pivot arms and means for respectively pivotally securing each of said first and second pivot arms to said first and second brackets along a first vertical pivot axis;
   (c) a first framework and means for pivotally coupling said first framework to said first and second pivot arms along a second vertical pivot axis;
   (d) latch means for selectively restraining said first framework in parallel alignment with said vehicle at an end mounting position and a side mounting position rotated approximately 270 degrees from said end position; and
   (e) means coupled to said first framework at a third vertical pivot axis for pivotally supporting a spare tire and wheel about said first framework and on said third vertical pivot axis whereby the same surface of said tire and wheel is exposed at each of said end and side mounting positions without dismounting said spare tire.

2. Apparatus as set forth in claim 1 wherein said spare tire and wheel support means comprises a second framework pivotally mounted to said first framework at said third pivot axis and includes an outwardly projecting threaded member for supporting said spare tire and wheel therefrom.

3. Apparatus as set forth in claim 2 including second latch means for selectively restraining said first framework to said second framework at each of said end and side mounting positions.

4. Apparatus as set forth in claim 2 wherein said tire and wheel support means includes:
   (a) an annular collar secured to said second framework and having a plurality of notches along a peripheral edge;

(b) wherein said threaded member is rotatively mounted in said collar; and (c) means for selectively biasing said threaded member under spring pressure into engagement with one of said notches.

5. Apparatus as set forth in claim 1 wherein said latch means comprises:

(a) first and second L-shaped brackets, wherein each bracket includes a portion which outwardly projects from the vehicle to support a horizontal member of said first framework;

(b) means for securing a respective one of said first and second L-shaped brackets to the vehicle at each of said end and side mounting positions; and (c) pin means coupled to said first framework for cooperatively securing said first framework to each of said first and second L-shaped brackets under a spring bias.

6. Apparatus as set forth in claim 1 wherein said first framework includes third and fourth extension arms, each of said third and fourth extension arms being coupled at one end to one of said first and second pivot arms at said second pivot axis and each including means at an opposite end for adjustably coupling to said first framework, whereby each of the vertical spacing between said first and second brackets and the vertical mounting position of said carrier may be varied relative to said vehicle.

7. Apparatus as set forth in claim 1 wherein said first framework includes first and second horizontal frame members secured to a first vertical frame member in parallel side-by-side relation to each other.

8. Apparatus as set forth in claim 7 wherein said first framework includes a second vertical frame member secured between said first and second horizontal frame members defining said third pivot axis, wherein said tire and wheel support means includes a tubular member concentrically, rotatively mounted about said second vertical member and wherein said tubular member includes an annular collar having a plurality of notches along a peripheral edge and supporting an L-shaped threaded member whereto said tire and wheel are secured.

9. A vehicular utility carrier comprising:

(a) first and second brackets and means for mounting said first and second brackets in displaced relation to each other and to said vehicle;

(b) first and second pivot arms and means for respectively pivotally securing each of said first and second pivot arms to said first and second brackets along a first vertical pivot axis;

(c) a first framework including first and second horizontal frame members secured to a vertical frame member in side-by-side parallel relation to one another and means for pivotally coupling said vertical frame member to said first and second pivot arms along a second vertical pivot axis;

(d) latch means for selectively restraining said first frame work in parallel alignment with said vehicle at each of an end and a side mounting position rotated approximately 270 degrees from said end position; and (e) means coupled to said first framework at a third vertical pivot axis defined along said first and second horizontal frame members for pivotally supporting spare tire and wheel about said first framework whereby the same surface of said tire and wheel is exposed at each of said end and side mounting positions without dismounting said spare tire.

10. Apparatus as set forth in claim 9:

(a) wherein said spare tire and wheel support means comprises a second framework pivotally mounted to said first framework at said third pivot axis and includes an outwardly projecting threaded member for supporting said spare tire and wheel therefrom; and (b) wherein said latch means comprises;

(i) first and second L-shaped brackets, wherein each bracket includes a portion which outwardly projects from the vehicle to support one of said first and second horizontal frame members;

(ii) means for securing a respective one of said first and second L-shaped brackets to the vehicle at each of said end and side mounting positions; and (iii) pin means coupled to said first framework for cooperatively securing said first framework to each of said first and second L-shaped brackets under a spring bias.

11. Apparatus as set forth in claim 9 including third and fourth extension arms, each pivotally coupled at one end to said first and second pivot arms at said second pivot axis and each including means at an opposite end for adjustably coupling said third and fourth extension members along said vertical frame member.

12. A vehicular utility carrier comprising:

(a) first and second brackets and means for mounting said first and second brackets in displaced relation to each other and to said vehicle;

(b) first and second pivot arms and means for respectively securing each of said first and second pivot arms to said first and second brackets along a first vertical pivot axis;

(c) a first framework including first and second horizontal frame members secured to a vertical frame member in side-by-side parallel relation to one another and means for pivotally coupling said vertical frame member to said first and second pivot arms along a second vertical pivot axis;

(d) a second vertical frame member secured between said first and second horizontal frame members defining a third pivot axis, and a tubular member concentrically, rotatively mounted about said second vertical member and including an annular collar having a plurality of notches along a peripheral edge and supporting an L-shaped threaded member whereto a spare tire and wheel are secured such that said tire and wheel are rotatable about said first framework such that the same surface of said tire and wheel is exposed at each of an end and a side mounting position without dismounting said tire and wheel and wherein said carrier is rotated approximately 270 degrees from said end position to said side mounting position relative to said first vertical pivot axis; and (e) latch means for selectively restraining said first framework in parallel alignment with said vehicle at each of said end and side mounting positions.

13. Apparatus as set forth in claim 12 including means for adjustably coupling said first and second pivot arms to said first framework, whereby each of the vertical spacing between said first and second brackets and the vertical mounting position of said carrier may be varied relative to said vehicle.

* * * * *